COMPUTER ERROR ANTICIPATOR AND CYCLE EXTENDER

Filed Jan. 18, 1968 3 Sheets-Sheet 1

INVENTORS
WILLIS E. HARTLIPP
HENRY G. HEALY
ANGELO S. RUGGIERO
WILLIAM F. SHUTLER

BY Sughrue, Rothwell, Mion, Zinn & Macpeak.
ATTORNEYS

United States Patent Office 3,548,177

Patented Dec. 15, 1970

3,548,177

COMPUTER ERROR ANTICIPATOR AND CYCLE EXTENDER

Willis E. Hartlipp and Henry G. Healy, Pleasant Valley, Angelo S. Ruggiero, Wallkill, and William F. Shutler, Wappingers Falls, N.Y., assignors to International Business Machines Corporation, a corporation of New York

Filed Jan. 18, 1968, Ser. No. 698,905

Int. Cl. G06f *11/00;* G11c *29/00*

U.S. Cl. 235—153 10 Claims

ABSTRACT OF THE DISCLOSURE

In response to a noise signal from a microprogram control store indicating probable next cycle computer error, the computer pauses in its operation until the computer cycle following the dissipation of the noise signal. At the end of the pause the computer continues operating from the point at which it was when the pause started. The pause is accomplished by blocking certain of the clock pulses, thereby preventing a change of contents in the latches and registers, and providing means for time synchronizing the memory cycles of the main memory and a local storage device with the center processing unit of the computer at the end of a pause.

BACKGROUND OF THE INVENTION

The invention is in the art of computers and specifically is a system for extending a computer cycle in response to an anticipated error rather than waiting for the error to occur and bringing the computer to a hard stop.

In present day computer systems the speed of operation is an important consideration in the attainment of goals requiring complex and/or multiple computations. Science and technology have greatly improved computer speed and consequently computer capabilities by providing new components which switch at extremely rapid rates. Generally, the high speed elements are smaller than their older slower counterparts and operate with lower level voltages and currents. Although there are obvious advantages in the use of low level voltages and currents, a disadvantage is the fact that the signals can be masked by lower level noise causing possible error. The most common method of dealing with errors is to detect the error when it occurs and either bring the computer to a hard stop or re-cycle the program to some predetermined re-starting point. The result is that a great amount of time, in terms of overall program time, is added to the program execution.

SUMMARY OF THE INVENTION

In accordance with the present invention the computer is paused in response to a signal indicating probable next cycle error until there is no longer any likelihood of an error. The probable next cycle error signal preferably comes from the microprogram control store and may be generated in response to noise level in the array of the control store. A system for providing such a signal is described and claimed in an application titled "Probable Future Error Detector" by William F. Shutler, Ser. No. 698,896, filed concurrently herewith and assigned to the assignee of the present application.

DETAILED DESCRIPTION OF THE DRAWINGS

The invention will be explained in connection with a prior art computer of a type which is well known; one such computer is described in: IBM Manual Form 223-2821-O, Copyright 1966, and IBM Manual Form 223-2822-O, Copyright 1965. In order to understand the invention some of the basic timing sequences in the prior art computer will be set forth herein. It should be noted that only so much of the timing sequence will be described herein as is necessary for a complete understanding of the present invention. Also, even though the invention is described in connection with a computer having a read only microprogram control store it will be apparent to one of ordinary skill in the art that the invention is equally applicable to destructive and non-destructive read-out control stores.

Figure 1:
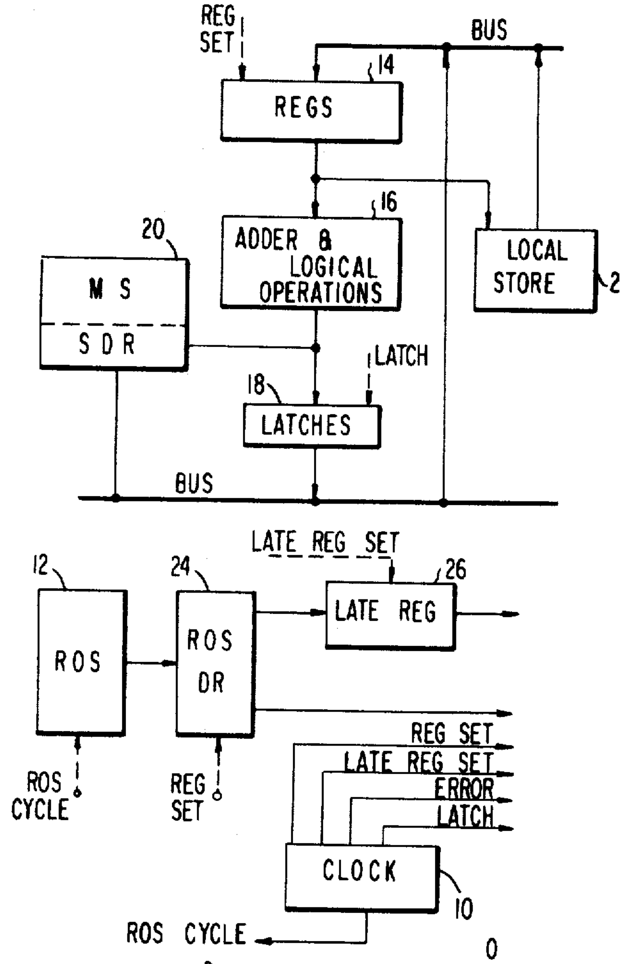
FIG. 1 is a block diagram illustrating the functional units of a prior art computer which can be paused by the present invention.
Figure 2:
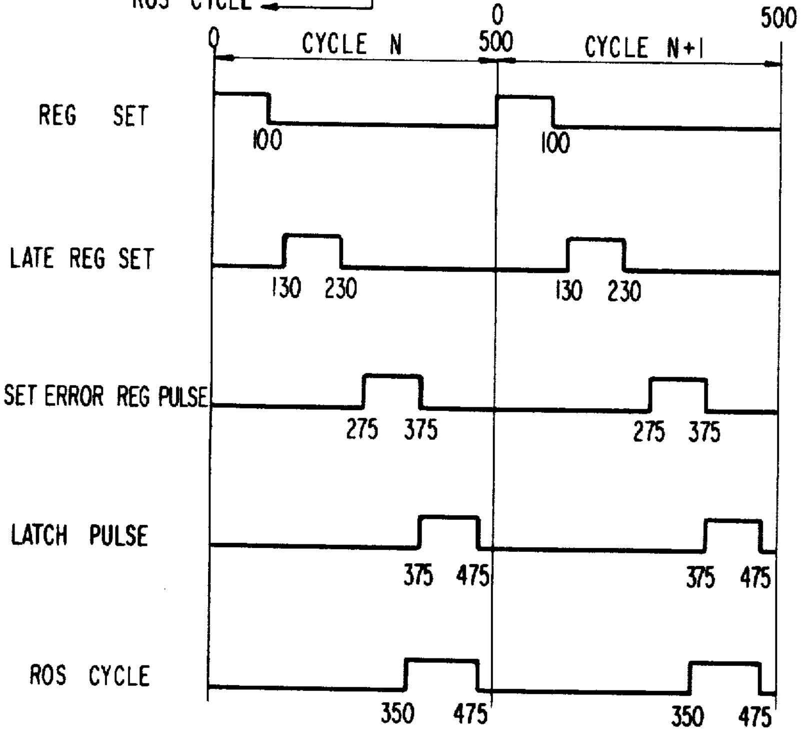
FIG. 2 is a timing diagram illustrating the clock pulses in a cycle of operation of the computer of FIG. 1.

A block diagram of the functional units of the prior art computer lumped together in accordance with their timing sequences is illustrated in FIG. 1. The basic CPU cycle is 500 ns. and is under control of the CPU clock 10, which produces during each 500 ns. CPU cycle five basic clocks. These are the REG SET, LATE REG SET, ERROR, LATCH and ROS CYCLE clocks. Their timing relative to each cycle is illustrated in FIG. 2 wherein each of the numbers indicates the approximate nanosecond count when the clock starts and ends during the 500 ns. cycle.

From a data flow standpoint the CPU includes registers 14, an adder and other logical units 16, latches 18, a main store 20, and a local store 22. During a single CPU cycle data flows from a register or registers 14 through a logical operation unit 16 to the latches 18. Control lines, not shown, control which latches, registers, logical units and memories enter into the computer operation at any one time, and clock pulses cause the entry of data into the registers and latches.

There is also a microprogram control store which may comprise, for the computer of the specific example, a read-only storage (ROS) device. The ROS 12 provides a microprogram word which exercises complete control over the CPU control lines via decoders and other means. Thus, the microprogram word, which is entered into a read-only store data register 24 (ROSDR) selects which of the registers 14 spill their contents into a logical unit 16, which latches 18 receive data from a logical unit, etc. The addressing of the microprogram control store is not important to an understanding of the present invention, however, it may be noted that the address of each succeeding microprogram word is partially determined by the microprogram word is partially determined by the microprogram word presently in ROSDR 24.

In order to provide a ROS word to control a CPU cycle, the control store must begin cycling during the previous CPU cycle. At about 350 times a pulse, illustrated in FIGS. 1 and 2 as the ROS cycle pulse, pulses the addressed ROS drive line which sends the selected ROS word to sense amplifier and sense latches. Thus, the ROS word which is selected at 350 time of cycle N−1 is ready to be placed in ROSDR 24 so that it can control the CPU during cycle N. The ROS word held waiting in the sense latches is gated into ROSDR 24 by the REG SET clock.

The REG SET clock, shown in FIG. 2, is available at the beginning of the 500 ns. CPU cycle for the purpose of setting data into registers 14. The data may be coming from local storage unit 22 or from the adder output latches 18. Also, as mentioned above, the REG SET clock sets the ROS word into the ROSDR 24.

Because data processed in one CPU cycle must be gated into a register 14 at the beginning of the next cycle, a means is provided to set control information into a register sometime after the beginning of a CPU cycle. The Late Reg Set pulse is available at about 150 time of every 500 ns. CPU cycle. Control information corresponding to a field of the ROS word in ROSDR 24 is set into the Late Command Register 26 by the Late Reg Set pulse at time 150 of the present cycle and remains in the Late Command Register 16 until 150 time of the following cycle. Thus a field of the ROS word for cycle N remains to control the entry of data into one of the registers 14 during the beginning of cycle $N+1$. In this manner the ROS word for cycle N controls data flow from a register 14 to a register 14.

The Set Error register pulse is available to sample all possible error conditions as early in the CPU cycle as possible and still allow the machine to stop on an error at the end of the same cycle. It should be noted that the errors sampled by the latter pulse have no relation to the sensing of probable error and the pause of the CPU. The set error register pulse samples built in detected error conditions which have already occurred, whereas the computer pause, which is the subject of the present invention, responds to an electrical indication of a probable next cycle error.

The Latch Pulse is available at about 350 time to set adder outputs into the latches 18. Any data placed in the latches 18 remains available until about 350 time of the following cycle. The Reg Set pulse at 0 time of the same following cycle can be used to gate data from the output latches 18 into one of the registers 14.

The Main Store 20 stores most of the data to be operated upon by the computer and operates on a 2 μsec. main store cycle which encompasses four CPU cycles. The main store operates under control of a main store clock in response to a NEED STORAGE CYCLE request on a control line. The timing of the main store cycle and the data flow are illustrated in FIGS. 3 and 4.

The main store includes an array 30 and a storage data register (SDR) 32. Data transfer takes place between the latches 18 and the SDR 32. The two operations performed by the main store are FETCH and STORE. In both operations the 2 μsec. main store cycle includes a 1 μsec. read cycle followed by a 1 μsec. write cycle. The difference being that for a FETCH, the data read out during the read cycle is set into SDR 32 and written back into the main store array 30 during a write cycle, whereas, for a STORE, the data read out during the read cycle is not set into SDR 32, and during a write cycle the data from a latch 18 having been set into SDR 32 is written into the array 30.

Figures 3, 4:
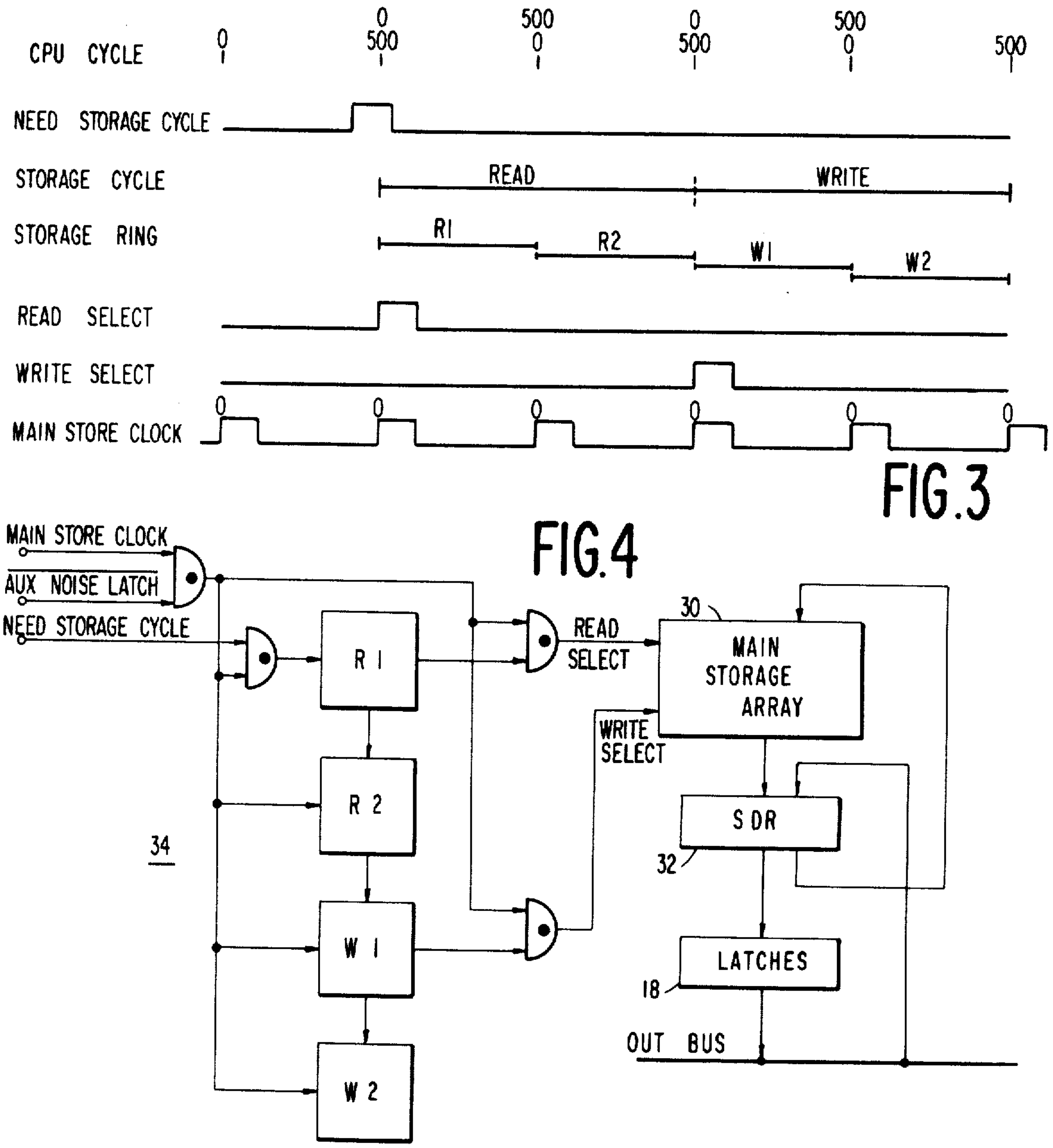
FIG. 3 is a timing diagram illustrating the timing sequence of the main memory of the computer of FIG. 1.
FIG. 4 is a block diagram of the main memory controls in accordance with the present invention.

The storage cycles are taken on demand in response to a NEED STORAGE CYCLE request illustrated in FIG. 3. The latter request AND's with the main store clock, which occurs at 0 time of each CPU cycle, to start the ring counter 34. The ring counter 34 keeps track of the time of the storage cycle relative to the CPU cycles. Thus, the 4 CPU cycles occupied during storage cycle are referred to as $R_1$, $R_2$, $W_1$, and $W_2$ and are illustrated in FIG. 3. The Read Select pulse starts the read cycle and the Write Select pulse starts the write cycle. It should be noted that once the read cycle starts it continues until completion, and once the write cycle starts it continues to completion.

When data is being FETCHED from the main store, the sense amplifier outputs (not shown) are strobed into SDR 32 beginning about 300 nanosecond into $R_2$ time. By 385 nanoseconds of $R_2$, all bits from the addressed location are in SDR 32 and the latch pulse sets the data from SDR 32 into the latches 18 thus providing the CPU with a word from storage at Reg Set Pulse time of $W_1$. If data is being STORED into the main store, the sense amplifier outputs are not strobed into SDR 32. Instead, the contents of a latch 18 are gated into SDR 32 at Reg Set Pulse time of $R_2$ or $W_1$, and that data is then written into the array 30 during the write cycle.

Figure 5:
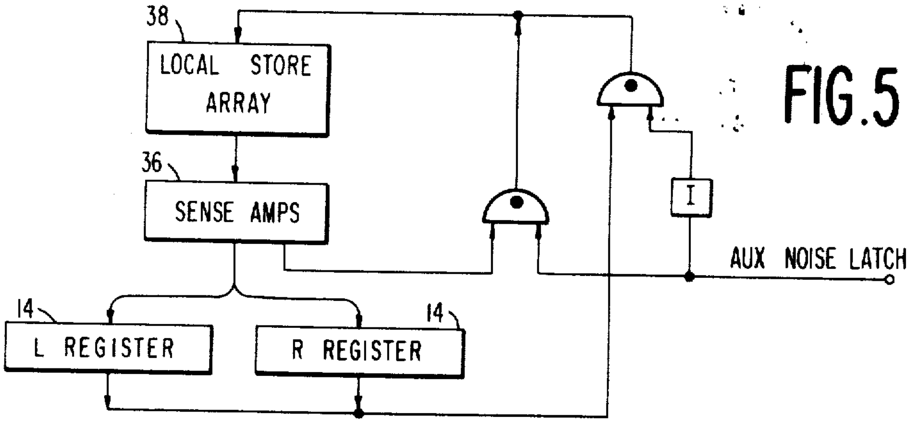
FIG. 5 is a block diagram of the local storage data flow in accordance with the present invention.
Figure 6:
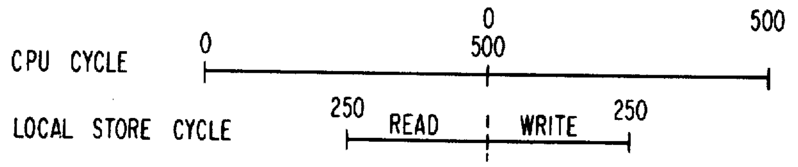
FIG. 6 is a timing diagram showing the relation between a CPU cycle and a local storage cycle.

The local store 22 is a scratch pad memory unit for the computer. It holds a relatively small number of data words but is able to release its data to the computer in a single CPU cycle. The data flow path and the timing of the local store cycle are illustrated in FIGS. 5 and 6. The L and R registers are part of the group of registers indicated in FIG. 1 by the numeral 14. The local store cycle is 500 nanoseconds long and is skewed with respect to the CPU cycle to run from 250 time to 250 time as illustrated in FIG. 6. Circuitry in the CPU mixes a clock pulse with a select local store line to produce a start storage pulse which initiates a local store cycle. The selected array lines are pulsed, and the local storage word selected is presented to either the L or the R register via latch-type sense amplifiers 36, 150 to 200 nanoseconds after the local store cycle has started. The contents of either the L or R register may be written into local storage array 38 immediately following any read cycle.

One additional feature of the computer is the break-in cycle. The I/O Channel Break-In, including its functions and operation is described and claimed in co-pending U.S. patent applications Ser. No. 573,246, M. A. Krygowski et al., "Improved Program Suspension System" filed Aug. 18, 1966 and now Pat. No. 3,453,600, and Ser. No. 486,326, P. N. Corbett et al., "Variable Priority Access Systems," filed Sept. 10, 1965 and now Pat. No. 3,399,384. To fully understand one of the features of the present invention it is sufficient to note the following characteristic of an I/O Channel Break-In cycle: When a Break-In request occurs a hardware line comes up and zeroes ROSDR at about 375 time of the present CPU cycle. The microprogram word on the sense lines of the control store array are blocked from entering ROSDR and thus the word 00 . . . 0 controls computer operation for the following cycle to perform a pre-assigned transfer operation. The important thing to note is that during the latter mentioned cycle, the control word is the result of a hardware line and is not the result of a read-out of the noise sensitive control-store.

In accordance with the present invention a pause in the CPU operation is initiated in response to an electronic indication that an error probably occur in the next CPU cycle. One particular system for providing an error anticipation signal is disclosed and claimed in the co-pending commonly assigned application W. F. Shutler, cited above. The error anticipation signal results from a noise signal above a preset level on a control store sense line during the read out of the control store. The detector for detecting noise above the preset level may be referred to as a noise detector. The signal indicates that the word presently being read out is probably wrong and therefore erroneous operations will probably occur during the next cycle if the word is allowed to control the CPU. Thus, the electronic indication of probable error may be referred to as a "next cycle probable error signal."

Figure 8:
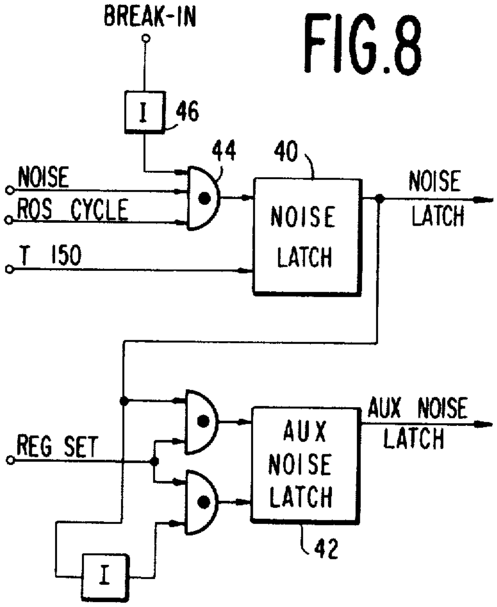
FIG. 8 is a block diagram of the latches and control means which operate to create the computer pause.
Figure 7:
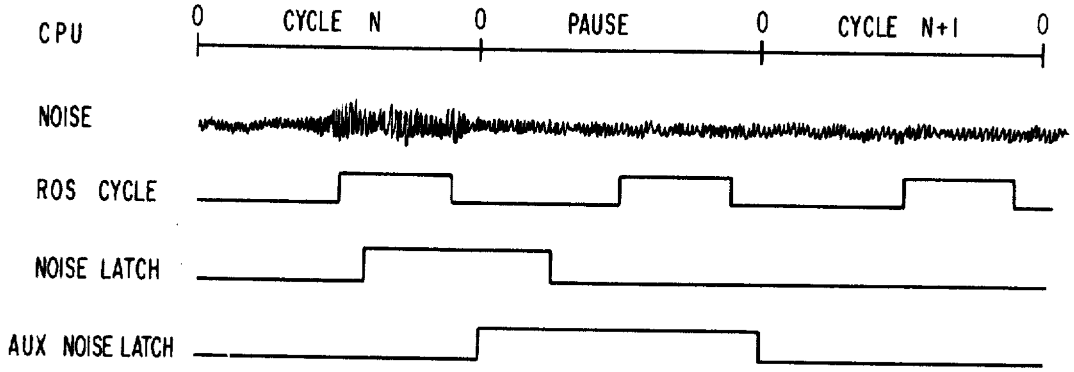
FIG. 7 is a timing diagram illustrating the time of operation of the latches which create the pause in the computer.

FIG. 7 shows the basic timing of the system for a "next cycle probable error signal" occurring during the read out of the microprogram word in CPU cycle N. The noise, being above a threshold level is detected by noise detector 13 of FIG. 9 whose output indicates probable error in the next cycle. The output therefrom, labeled NOISE is ANDed with the ROS cycle to set the Noise Latch 40 shown in FIG. 8. The Noise Latch Pulse lasts until 150 time of the next cycle when the Noise Latch is reset by a clock pulse at 150 time. The Noise Latch pulse is ANDed with the REG SET pulse to set the Auxiliary Noise Latch 42 at zero time of the next cycle. The Aux Noise Latch pulse lasts for a complete CPU cycle. The Auxiliary Noise Latch 42 is reset by ANDing the REG SET pulse with NOT Noise Latch. Since the ROS cycle occurs each CPU cycle regardless of the conditions of the noise latches, the pause in the CPU operation will extend over plural cycle times until the noise dissipates. Thus, in FIG. 7, the noise above threshold dissipates prior to the following ROS cycle causing the pause to last for only a single CPU cycle.

Figures 9, 10:
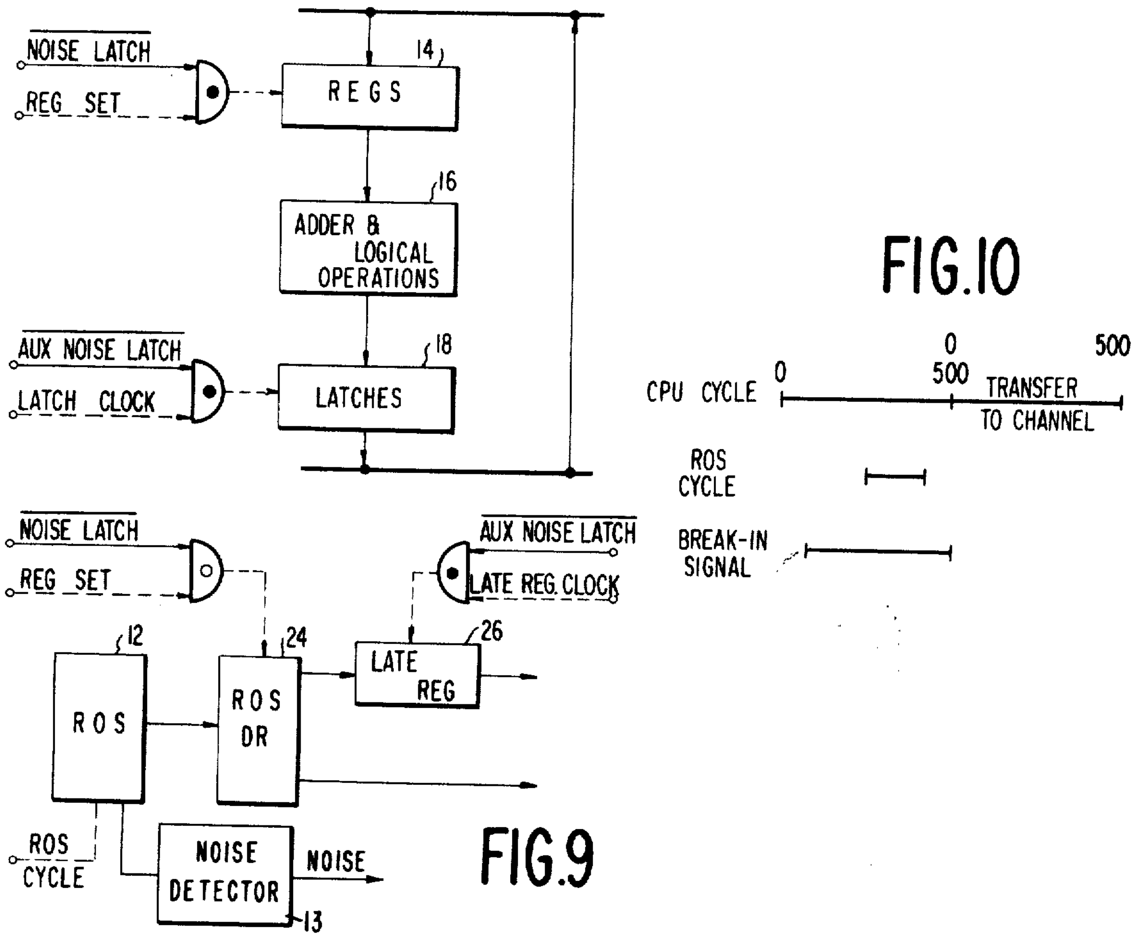
FIG. 9 is a block diagram illustrating the blocking of clock pulses to prevent operation of the CPU.
FIG. 10 is a timing diagram showing the relative times of the CPU cycle, the ROS cycle and a break-in signal.

The latch pulses control a pause of the registers 14, latches 18, adder and other logical units 16, and the ROSDR 24 in the following manner:

As illustrated diagrammatically in FIG. 9, the Noise Latch pulse blocks the Reg Set pulse from changing the contents of the registers 14 and from changing the contents of ROSDR 24. The Aux Noise Latch pulse blocks the latch clock from setting new data into the latches 18 and from changing the contents of the late command registers 26. The clock pulses in FIG. 9 are indicated by dashed lines. The sequence of the pause operation for the register and latches is as follows. During cycle N the CPU is being controlled by the ROS word for cycle N. The ROS cycle is initiated and a probable next cycle error is detected setting the Noise Latch 40. The Reg Set clock is blocked thereby preventing a change of data in the registers 14 and preventing the probably erroneous ROS word for cycle N+1 from entering ROSDR 24. The latch clock is blocked preventing a change in the latches 18 and in the late command register 26 following cycle N. It will be noted that the complete data flow for cycle N was allowed to take place prior to the pause, but the data ending up in the latches 18 is not entered in the registers 14 under control of a field from the cycle N ROS word until after the pause terminates. During the pause, as in all cycles, the ROS cycles takes place. The latches 40 and 42 will remain set and thus the clock pulses will be blocked until the noise dissipates. When there is no probable next cycle error signal during a ROS cycle, the CPU continues where it left off with the Reg Set pulse of the next CPU cycle. At that time, the ROS word for the N+1 cycle is entered into ROSDR 24. However, a field of the N cycle ROS word is still in the late command register 26 to control entry of data into a register 14 from a latch 18 thereby completing the operation of the CPU in response to the N cycle ROS word.

During the pause, means are also provided to allow the main store 20 to pause for a long enough time so that when the CPU pause ends the main store 20 has the correct timing relation with the remainder of the system. The problem of timing concerns a Store operation of main store. Referring back to FIGS. 3 and 4, it will be remembered that for a Store operation the new word to be entered into the array 30 comes from latches 18 and is entered into SDR 32 prior to the write select pulse. Once the write select pulse occurs the word in SDR 32 is written into the array 30. Now suppose a probable next cycle error signal is detected so that the CPU pauses after the read select pulse has initiated the 1 μsec read cycle. Due to the pause, the proper word to be entered into SDR 32 from latches 18 will not be in the latches 18 at the proper time. In order to prevent the main sore from running ahead of the rest of the system, means are provided to block the main store clocks during the pause. This is illustrated in FIG. 4 which shows the main store clock being ANDed with a NOT Auxiliary Noise Latch input. Thus, if a pause occurs during read cycle time, the ring counter will await the end of the pause before initiating the write select pulse and write cycle, thereby allowing the latches 18 to catch up with main store.

It is also necessary to adapt the local store to a pause. Referring again to FIGS. 5 and 6, the local store, under control of a field of the ROS word, performs a read followed by a write. Once the local store cycle is started it runs to completion. During read, the word in the addressed location is sensed and ready to be entered into the L or R register. The word is entered into the proper register by the Reg Set clock of the CPU cycle which overlaps the write portion of the local store cycle. If a pause is caused during the latter CPU cycle, the Reg Set pulse will be blocked thereby preventing the probably incorrect word from being entered into the L or R register. In order to prevent the writing of a wrong word into the local store the present invention provides a means, shown in FIG. 5, for regenerating the word from the sense amplifiers and blocking the word from the L or R register.

When a probable next cycle error signal is detected during the first CPU cycle shown in FIG. 6, the Auxiliary Noise Latch 42 is set at 0 time of the following cycle. As discussed above, the Noise Latch signal prevents a change of data in the registers, including the L and R registers. As illustrated in FIG. 5, the Aux Noise Latch signal is ANDed with the word just read out of the array to place the word back into the array during the write portion of the local store cycle. Also, the NOT Aux Noise Latch signal is ANDed with the outputs from the L and R registers to prevent their contents from being entered into the array during the write portion of the local store cycle. Thus, at 250 time of the pause cycle, which is at the end of the local store cycle, the local store array 38 will have the same contents it had at the beginning of the local store cycle.

Since the local store cycle is controlled by a field of the ROS word in a late command register 26, and since the field in a late command register 26 does not change during a pause, the local store cycle will be restarted at 250 time of the pause cycle. In this manner the local store cycle will keep repeating itself during the pause, but data will not be entered into or taken from the L and R registers until the pause has ended. It should be noted here that the gating of data by a gating pulse is illustrated by the symbol for a logical AND function gate. However, it will be apparent that a bank of logical gates is used to gate a data word in response to a gating pulse.

An additional feature of the present invention concerns the break-in cycle referred to above. As stated above, it takes one CPU cycle following a break-in signal to transfer ROS control from the CPU to the channel requesting the break-in. The relative timing of the CPU cycles, the ROS cycle, and the break-in signal is shown in FIG. 10. If a probable next cycle error occurred during the break-in signal it would be unimportant since the word entered in ROSDR as a result of Break-In request is due to a hardware line and therefore is not sensitive to noise in the microprogram control store. Thus, circuitry of FIG. 8 which sets the Noise Latch is disabled by applying Break-In signal to the AND gate 44 via the Invert gate 46.

While the invention has been particularly shown and described with reference to preferred embodiments thereof, it will be understood by those skilled in the art that various changes in form and details may be made therein without departing from the spirit and scope of the invention.

What is claimed is:

1. In a computer having a source of cyclically varying control signals for controlling cycles of gating activity of the computer logic system and having an associated information store cycling at a rate different from the activity cycling rate of said computer logic system and source:

means for sensing noise likely to affect said control signals, at a time just prior to each activity cycle when the control signals instantly being produced by said source are most likely, in the presence of excessive noise, to cause computing error in the ensuing cycle; and means responsive to sensing of an excessive level of noise by said sensing means to control said source, said computer logic system and said associated store to cause said source and computer logic to pause in their respective activity for at least one cycle of said sensing means and immediately thereafter to reproduce their respective signalling conditions instantly preceding said pause, and to coordinate the action of said store with the computer logic by selectively extending the cycle of said store.

2. In a computer having a source of cyclically varying control signals for controlling cycles of gating activity of the computer logic system and including means for conditionally suppressing the output of said source and substituting a predetermined control signal upon occurrence in any cycle of a predetermined condition in the processing system in which said computer functions, said condition being a break-in request, the improvement comprising:

means for sensing noise likely to affect said control signals, at a time just prior to each activity cycle when the control signals instantly being produced by said source are mostly likely, in the presence of excessive noise, to cause computing error in the ensuing cycle; and means responsive to sensing of an excessive level of noise by said sensing means to cause said source and computer logic to pause for at least one cycle of operation of said sensing means and immediately thereafter to reproduce their respective signalling conditions as present at the instant of initiation of the pause, and means responsive to occurrence of a said predetermined condition, immediately prior to operation of said means responsive to said sensing means to disable the latter means and thereby prevent initiation of a said pause.

3. In a computer of the type having registers, latches, operational units which receive data from said registers and send data after processing to said latches, a microprogram control store which provides an output word during a read-out time each computer cycle for controlling the computer operation for the next succeeding computer cycle. said computer being controlled by said output word when said output word is entered into a control storage data register, and a main store which operates on a read cycle followed by a write cycle, said read and write cycle combined being greater than a computer cycle, the invention comprising, (a) means for testing for a probable next cycle error signal during said read-out time of each computer cycle and for providing an electronic indication of said signal each time it occurs, (b) means responsive to each said electronic indication for blocking the entry of data into said registers, said latches and said control storage data register for the next succeeding computer cycle and (c) means responsive to each electronic indication between the start of said read cycle and the start of said write cycle of said main store for delaying the start of said write cycle by one full computer cycle.

4. In a computer as claimed in claim 3 said computer further having a local storage means having a non-interruptable read-write cycle equal in time to said computer cycle but skewed with respect to said computer cycle, the invention further comprising, means responsive to each said electronic indication occurring during a read portion of said local storage readwrite cycle for writing into said local storage means during the write portion of said read-write cycle the data word read-out during said read portion.

5. In a computer as claimed in claim 3 which computer further having a channel break-in provision whereby in response to a channel break-in signal said output word is blocked from entering said control storage data register and a preassigned control word is entered into said control storage data register, the invention further comprising means responsive to a channel break-in signal for disabling said means for testing and providing long enough to prevent a pause in computer operation while said preassigned control word is in said control storage data register.

6. In a computer as claimed in claim 4 said computer further having a channel break-in provision whereby in response to a channel break-in signal said output word is blocked from entering said control storage data register and a preassigned control word is entered into said control storage data register, the invention further comprising means responsive to a channel break-in signal for disabling said means for testing and providing long enough to prevent a pause in computer operation while said preassigned control word is in said control storage data register.

7. In a computer as claimed in claim 6 said computer also having late command registers for receiving fields of the word in said control storage data register, said fields from the word in said control storage data register during cycle N serving the purpose of controlling certain parts of the computer during the beginning of cycle N+1, the invention further comprising, means responsive to each said electronic indication for blocking the entry of a field into said late command registers for the next succeeding computer cycle.

8. In a computer as claimed in claim 7, said means for testing and providing comprising, (a) a noise latch responsive to the occurence of a probable next cycle error signal during said read-out time for providing a noise latch output pulse which lasts until a predetermined time into the next computer cycle, and (b) an auxiliary noise latch responsive to the output of said noise latch and the beginning of each computer cycle for providing an auxiliary noise latch output starting at the beginning of the first computer cycle which is in coincidence with said noise latch output pulse and terminating at the beginning of the first computer cycle which is not in coincidence with said noise latch output pulse.

9. In a computer as claimed in claim 8, said means for blocking the entry of data comprising, (a) logic means responsive to the output of said noise latch for blocking the entry of data into said registers and said control storage data register during the occurrence of said noise latch output pulse, and (b) logic means responsive to the output of said auxiliary noise latch for blocking the entry of data into said latches during the occurrence of said auxiliary noise latch output pulse.

10. In a computer as claimed in claim 9, said means for delaying the start of said write cycles comprising, (a) a four stage ring counter means operative during a main store cycle to receive clock pulses at a rate equal to the frequency of said computer cycle and provide a write cycle initiation pulse for starting the write cycle in response to the third clock pulse received thereby, and (b) means responsive to the output of said auxiliary noise latch for blocking said clock pulses from said ring counter during the time of said auxiliary noise latch output pulse.

References Cited

UNITED STATES PATENTS

| | | | |
|---|---|---|---|
| 3,386,079 | 5/1968 | Wiggins | 340—146.1 |
| 2,756,409 | 7/1956 | Lubkin | 340—146.1X |
| 3,214,700 | 10/1965 | Hook | 340—253X |
| 3,391,344 | 7/1968 | Goldberg | 325—42X |

OTHER REFERENCES

Ashley and Cohler, Solving Noise Problems in Digital Computer Memories, Electronics, March 25, 1960, pp. 72, 73, 74.

EUGENE G. BOTZ, Primary Examiner

C. E. ATKINSON, Assistant Examiner

U.S. Cl. X.R.

340—172.5